United States Patent [19]

Feldman et al.

[11] Patent Number: 5,115,675

[45] Date of Patent: May 26, 1992

[54] TENSIONED BELLOWS PRESSURE TRANSDUCER

[75] Inventors: Alexander I. Feldman, Redmond; Dale W. Shoup, Edmonds, both of Wash.

[73] Assignee: The Slope Indicator Company, Seattle, Wash.

[21] Appl. No.: 538,884

[22] Filed: Jun. 15, 1990

[51] Int. Cl.[5] .......................... G01L 7/06; G01L 11/00
[52] U.S. Cl. ........................................ 73/704; 73/728; 73/729; 73/DIG. 1
[58] Field of Search ................. 73/704, 729, 722, 728; 310/338, 321, 323, 324, DIG. 1

[56] References Cited

U.S. PATENT DOCUMENTS

| | | | |
|---|---|---|---|
| 2,447,817 | 8/1948 | Rieber | 73/704 |
| 3,062,052 | 11/1962 | Kolb | 73/704 |
| 3,216,260 | 11/1965 | Erdely | 73/704 |
| 3,543,585 | 12/1970 | Brown | 73/704 |
| 3,638,496 | 2/1972 | King | 73/704 |
| 3,935,745 | 2/1976 | Jonell et al. | 73/704 |
| 4,149,422 | 4/1979 | Olsen et al. | 73/704 |
| 4,255,973 | 3/1981 | Karplus | 73/704 |
| 4,476,725 | 10/1984 | Chorel et al. | 73/704 |
| 4,644,796 | 2/1987 | Ward | 73/702 |
| 4,938,068 | 7/1990 | Clements | 73/704 |

Primary Examiner—Donald O. Woodiel
Attorney, Agent, or Firm—David L. Garrison

[57] ABSTRACT

A tensioned bellows pressure transducer having a pressure chamber [40], an elastic vibrating member [50], an electromagnetic coil [60] a linkage [33], a rigid body [30], a body extension [35], and a pressure deformable member [22] defining in part a reference chamber [20]. In preferred embodiments, the pressure deformable member is a bellows. Bellows [22] is attached at bellows fixed end [23 to rigid body [30] and is deformable in response to a difference between a bellows internal reference pressure $p_0$ and any pressure $p_1$ external to bellows [22], such as in pressure chamber [40]. Elastic vibrating member [50] is connected at a first end to linkage [33]. Linkage [33] projects rigidly from an interior face of bellows free end [24] and vibrating member [50] is connected to linkage [33] at a distance $d_2$ from free end [24], and is connected to body extension [35] at a distance $d_1$ from free end [24], where $d_1$ is less than $d_2$. Thus tensile stress in elastic vibrating member [50] is increased by compressional deformation of bellows [22], and member [50] restrains deformation of bellows [22] through tension loading of bellows [22].

17 Claims, 2 Drawing Sheets

TENSIONED BELLOWS PRESSURE TRANSDUCER

TECHNICAL FIELD

The invention relates to the field of pressure measurement instrumentation and devices, particularly to pressure transducers for pressure measurement by means of changes in tensile stress in an elastic vibrating member. More particularly this invention relates to a method and apparatus having a pressure deformable member that is under tension when linked to the vibrating member and exposed to an external pressure.

BACKGROUND OF THE INVENTION

Some conventional pressure transducers rely on the deflection of a precisely machined diaphragm to activate corresponding changes in strain in a highly pretensioned vibrating wire attached to the diaphragm. The force applied by a pressure $p_1$ to which the transducer is exposed is absorbed in the diaphragm, and the electromagnetically excited vibrating wire only measures the diaphragm's response to that force. Because the diaphragm is deformationally much stiffer than the wire, deformation in the diaphragm controls the deformation in the wire. A change in the deformation of the wire in turn corresponds to a change of tensile stress in the wire which causes an electromagnetically detectable change in the resonant vibrating frequency of the wire. Such transducers commonly encounter problems of nonlinearity over the range of expected measurement values, in addition to other problems such as long-term wire "creep" or pretension loss, crimp slippage or deformation, and necessity of the temperature compensation.

Moreover, the typical reverse direction in which tensile stress in the vibrating wire is relieved (that is, an increase in $p_1$ causes a decrease in the tensile stress in the pretensioned wire) compounds all of the above problems. The diaphragm of such a transducer has a controlled axial mechanical deformation response, when subjected to an external pressure $p_1$ that is different from the internal reference pressure. Pressure measurement ranges may be changed only by changing the geometry or the thickness of the diaphragm. A more detailed analysis of this type of pretensioned vibrating wire transducer and its relative shortcomings and advantages with respect to the art is presented in commonly owned, copending application by Clements, Ser. No. 07/250,179, filed Sep. 28, 1988, now issued Jul. 3, 1990 as U.S. Pat. No. 4,938,068.

Other known pressure transducers employ a pressure deformable bellows to respond to a differential between a pressure $p_1$ that is external to the transducer but which is applied internally to the bellows, and a reference pressure $p_0$ external to the bellows. By attaching one end of an elastic vibrating wire or strip to a movable end of the bellows so that an increase in pressure $p_1$ results in a direct increase in tensile stress in the wire, many of the difficulties encountered in the above described transducer structure are ameliorated. Unlike the diaphragm, the bellows is employed to directly convert the difference between $p_1$ and $p_0$ into a simple axial mechanical force that is transferred to a vibrating member. Also, the bellows typically has much less deformational stiffness than the vibrating member. The vibrating member is typically of a magnetically interactive material such as steel wire or a thin steel strip, and electromagnetic exciting and sensing means are associated with the vibrating member in a manner such as is summarized in Clements.

In these known transducers, the bellows is employed as the pressure chamber, with $p_1$ being internally applied to the bellows, and is typically surrounded by a reference pressure chamber having therein a reference pressure $p_0$. Various means and methods are also known for connecting the vibrating member to the movable end of the bellows so that an increase in pressure inside the bellows will increase the tensile stress in the vibrating wire.

For example, commonly owned copending application by Clements, referred to above, discloses a pressure transducer employing an external saddle type linkage on the outside of an expandable bellows to translate the axial mechanical force in the expanding bellows into an axial force in the vibrating member. But while Clements represents a significant improvement over previous designs, Clements nonetheless leaves unresolved certain problems of bellows stability and linear response in the pressure transducer.

In the method and apparatus disclosed and claimed by Clements, a differential in pressure $\Delta p$ between a pressure $p_1$ internal to the bellows and a reference pressure $p_0$ surrounding the bellows acts to impart motion to a movable end of the bellows with respect to a fixed end of the bellows. Since $p_1$ applied internally to the bellows acts symmetrically, any motion in the movable end of the bellows would tend to be perfectly uniaxial (that is, the bellows would have, for practical purposes, but a single axis of freedom of movement), but only if the bellows were mechanically unrestricted in its response to $\Delta p$. However in Clements, and in other known pressure transducers employing a pressure deformable bellows, the linkage between the movable end of the bellows and the vibrating member create together a mechanical system in a constrained state. Thus in Clements, for example, a positive $\Delta p$, which acts symmetrically to tend to increase the distance between the movable end of the bellows and the fixed end of the bellows, is opposed by the resistance of the mechanical linkage and the vibrating member to deformation. The force resulting from deformation of the vibrating member itself and the mechanical linkage to the movable end of the bellows tends to hold the bellows in a compressed state, and in fact applies a countervailing mechanical compressive force to the bellows to achieve equilibrium.

This compressive mechanical force is applied to the bellows in a typically unsymmetrical way and, unlike the influence of $\Delta p$ which has no destabilizing influence on the bellows, the mechanical force causes a destabilizing influence on the bellows which tends toward a phenomenon of "buckling". Stability of the bellows in this compression mode depends on the stiffness of the bellows and the magnitude of mechanical force acting on the bellows material for equilibrium under the pressure applied internally to the bellows. The stability conditions of the bellows are described by Euler theory. For any given pressure $p_1$, lower bellows stiffness results in an increase in the tendency for buckling deflections of the bellows. Thus in known pressure transducers the expected increase in linearity of transducer response which ought to come from employing bellows of lower stiffnesses cannot be taken advantage of because of the unstable buckling deflections resulting from compressive mechanical forces introduced to the bellows by the mechanical linkage of the bellows to the vibrating member.

In addition to these buckling deflections resulting in imprecise transfer of mechanical force from the bellows to the vibrating member which produces a significant nonlinearity of response in these known pressure transducers, they can also produce potential early failure modes.

There exists therefore a need for a vibrating member type pressure transducer employing a pressure deformable member without significant stiffness, such as for instance a bellows, to translate a pressure differential $\Delta p$ into a directly corresponding change in tensile stress in the vibrating member which can be sensed as a charge in resonant vibrating frequency. But such a transducer must not have the pressure deformable member subject to mechanical compressive forces. A transducer is needed wherein a positive differential in pressure $\Delta p$ tends itself to compress the bellows, as opposed to tending to expand it, so that the bellows is effectively under mechanical tension rather than compression when constrained by the vibrating member and its linkage.

DISCLOSURE OF THE INVENTION

Accordingly it is an object of the invention to provide a pressure transducer which measures positive changes in external pressure by compressing a pressure deformable member such as a bellows.

It is another object of the invention to provide a pressure transducer as described above which is capable of measuring a wider range of pressures than existing systems, and which can be made physically smaller as well. It is still another object of the invention to provide a pressure transducer as described above which links the interior of a relatively free end of the bellows directly through the bellows to a vibrating member, and in which the bellows is surrounded by a pressure sensing chamber.

It is also an object of the invention to provide a linkage mechanism for axially transmitting a force between a movable end of a pressure deformable member to a first end of an elastic vibrating member, wherein the second end of the elastic vibrating member is attached to the same rigid body to which the pressure deformable member is also attached.

It is a further object of the invention to provide a method of measuring the magnitude of a difference $\Delta p$ between an external pressure $p_1$ and a reference pressure $p_0$ by exposing the exterior of a reference chamber to the external pressure, allowing the reference chamber to tend to compress, in response to a positive $\Delta p$, to increase tensile stress in an elastic vibrating member connected between a movable end of the reference chamber and a rigid body to which the reference chamber is attached, and then sensing electromagnetically the tensile stress related change in the resonant vibrating frequency of the vibrating member.

These and other objects of the invention are accomplished by the means and in the manner hereinafter set forth. The disclosure of commonly owned, copending application of Clements, Ser. No. 07/250,179, filed Sep. 28, 1988, now issued on Jul. 3, 1990 as U.S. Pat. No. 4,938,068, is hereinafter incorporated by reference.

The invention is comprised of apparatus for and method of measuring the magnitude of some external pressure $p_1$ with respect to a reference pressure $p_0$ by applying the external pressure as directly and as completely as practically possible through a pressure deformable member, such as a bellows, through a linkage, to an elastic vibrating member which bears virtually all of the force resulting from the pressure difference $\Delta p$ between $p_1$ and $p_0$. In the apparatus and method of the invention, the magnitude of the difference between the external pressure and the reference pressure sets up a tensile stress in the vibrating member which causes a change, in a well known manner, in the resonant frequency at which the elastic vibrating member vibrates. Thus the frequency based electrical output signal corresponds directly to a tensile stress in the vibrating member as it responds to $\Delta p$ through the pressure deformable member and its associated linkage to the vibrating member.

A method of the invention comprises the steps of: 1) exposing an external surface of a reference chamber having an internal pressure $p_0$ to an external pressure $p_1$, where the reference chamber is preferably comprised of a bellows having a movable end movable in response to $\Delta p$ and a fixed end fixed to a rigid body; 2) allowing the bellows to compress, thereby increasing tensile stress in an elastic vibrating member connected between the movable end and the rigid body; and 3) sensing electromagnetically the change in tensile stress in the vibrating member by means of resonant frequency detection. In Step (2) above, the bellows may alternatively be allowed to expand, thereby decreasing tensile stress. The resonant frequency of the vibrating member may also be sensed by other methods and apparatus, for instance electrically sensing change in capacitance in the member, or optically sensing means either now known or later developed, without departing from the scope of the invention.

In a preferred embodiment a reference pressure (preferably 0 atmospheres) will typically be chosen such that all pressures to be read within a designed operating range will be greater than the reference pressure. Changes in pressure can obviously be both positive and negative changes and the bellows can expand as well as contract. In preferred embodiments, it is not necessary to have a significant amount of pretension in the vibrating elastic element. There need only be sufficient tension in the elastic member to obtain a resonant frequency of the member and this is accomplished in a preferred embodiment by evacuating the reference chamber as completely as practically possible. Depending upon the application, the reference chamber may also be ported to atmosphere or to a second pressure, so long as sufficient tension is applied to the vibrating member by other means. Those skilled in the art will appreciate that there should be no slack, or negative preloading, such as to bend the vibrating member.

The apparatus of the invention comprises a reference chamber, preferably further comprised of a conventional bellows (slightly extended) of metal or other suitably resilient material having preferably two flat ends and having the usual accordion pleated sides, such as is for instance disclosed in Clements. The reference chamber is a cavity and encloses a fluid, typically air, under a pressure $p_0$, where $p_0$ is preferably brought as close as possible to zero atmospheres. The bellows, or other suitably shaped pressure deformable member, has one of its ends fixably attached to a rigid body, and the other of its ends movable in response to a difference between $p_0$ within the reference chamber and some pressure $p_1$ external to the reference chamber. The preferred flexible bellows is thus axially deformed by that difference in pressure $\Delta p$. It is contemplated that other designs of reference chambers comprised of a pressure deformable member having a pressure movable end or surface may be substituted for the preferred formed metal bellows design without departing from the scope of the invention. For instance, the reference chamber and pressure deformable member can be combined in structure and so shaped that a surface of the member or chamber is movable in a direction orthogonal to that surface in response to $\Delta p$. Such a chamber can actually take any simple or complex geometric shape, as dictated by design, commercial, or other considerations, so long as a portion of the shape is pressure deformable in response to $\Delta p$, and that portion has a surface movable orthogonally in response to $\Delta p$.

Preferred embodiments of the apparatus of the invention will also be comprised of a pressure chamber enclosing a fluid under pressure $p_1$ in such a way that $p_1$ acts externally upon the reference chamber. Preferred embodiments of the apparatus of the invention will have the pressure chamber at least partially enclosing the reference chamber, and where the reference chamber is further comprised of the preferred metal bellows, the pressure chamber will preferably enclose all of the bellows. However, it is contemplated that a preferred design of the apparatus of the invention will employ a reference chamber of which the pressure deformable bellows is only a part, as will be further disclosed herein.

Preferred embodiments of the apparatus of the invention are each further comprised of a magnetically interactive elastic vibrating member such as a conventional vibrating steel wire or thin steel strip. The vibrating member is connected on one end to the movable end of the pressure deformable member, and on its other end to the same rigid body in such a way that axial compression of the bellows under a pressure $p_1$ greater than $p_0$ produces a moment of axial force at the movable end of the bellows which will tend to increase the tensile stress, and therefore the resonant vibrating frequency, in the vibrating member. The apparatus is also preferably comprised of conventional electromagnetic means, such as a coil electromagnet, to both excite the vibrating member into vibration at a resonant frequency and to detect changes in that resonant vibrating frequency.

Preferred embodiments of the apparatus will further employ a linkage which itself has much greater stiffness in response to linearly applied force than does the vibrating member. In preferred embodiments, the linkage is connected to or mounted upon the inside of the movable end of the bellows and extends longitudinally along, or parallel to, the axis of the bellows to typically project beyond the confines of the bellows through a port in the rigid body. The vibrating member is then attached at one of its ends to the projecting end of the linkage, while the other end of the vibrating member is attached either directly back to the rigid body itself or to a rigid extension of the body which will preferably project inwardly into the interior of the bellows. Thus one end of the bellows and one end of the vibrating member remain stationary with respect to the rigid body, while the movable end of the bellows and the other end of the vibrating member are capable of movement, both in the same direction.

For reasons which will be apparent to those skilled in the art, the vibrating member will preferably be mounted in such a way as to assure that its longitudinal axis is congruent with the axis of the bellows. Thus, whatever the linkage and body extension are made of and however they are mounted respectively to the movable end of the bellows and to the rigid body, they must each have a face upon which to mount their respectively associated ends of the vibrating member, across which faces the longitudinal central axis of the bellows passes.

Of course, it is not absolutely necessary to have a linkage projecting from the interior of the bellows. It is contemplated that some bellows designs will accommodate an appropriate length of vibrating member without having the linkage project from the interior of the bellows. That is, both the linkage and body extension may both be entirely interior to the bellows in appropriate circumstances. Similarly, where the linkage does project from the interior of the bellows into an auxiliary, and relatively nondeformable, portion of the reference chamber, the vibrating member may be attached directly to the rigid body without the use of an interiorly projecting body extension. In fact, a body extension might also be designed to project outwardly into the nondeformable portion of the reference chamber.

Depending upon the selected length of the vibrating member, selected in accordance with design criteria (including abatement of unfavorable resonance phenomena) which will be appreciated by those skilled in the art, it will typically be desirable to have the linkage project beyond the confines of the bellows, and at the same time to employ a body extension to project into the interior of the bellows, with the vibrating member stretched between the respective projecting ends of the linkage and the body extension. It will be appreciated that there is thereby created a structure for mounting and connecting a vibrating member which is functionally opposite to the structure proposed and taught by Clements.

In the present invention any pressure $p_1$ which will tend to compress the bellows and move the movable end toward its rigidly mounted fixed end will tend to drive the projecting end of the linkage further out of the bellows fixed end and, since the rigid body and its body extension have much greater stiffness than the vibrating member, the vibrating member will tend to be stretched, or have the tensile stress within the vibrating member increased, regardless of the degree of initial, or previously equilibrated, stretch in the vibrating member.

By way of comparison, in Clements, in order to obtain the same kind of increase in tensile stress in a vibrating member, it is necessary to tend to expand the bellows of Clements so that the Clements saddle translates the expansion movement of the bellows into a mechanical force acting to stretch the Clements vibrating member. This change in structure from that proposed by Clements gives rise to one of the fundamental advantages of the present invention.

The Clements transducer teaches introduction of an external pressure through a long tube in its body into the interior of the bellows, thereby tending to cause the bellows to expand against the reference pressure which is exterior to the bellows. In practice the Clements saddle and the tension or resistance to elastic stretch in the selected vibrating member act to confine the expansion of the Clements bellows so that the bellows is not truly in an expansion mode at all but is actually subjected to compression loading ("compression mode") by virtue of that confinement. Since the Clements bellows, under working pressures, is therefore always in a compression mode, i.e. subject to compression loading, it is subject to various instabilities and buckling factors produced by compression loading of the bellows. For example, the movable end of the Clements bellows mechanism actually moves, however slightly, from side to side under the influence of any pressure within an operating range of pressures rather than merely and truly axially, thereby introducing the problems of non-linearity in measurement described above as well as possible destruction modes in the operation of the bellows itself.

The tendency and amount of this side movement of the movable end depend on three characteristics of the compression loading: 1) eccentricity of the vector of the compressive force relative to the geometrical longitudinal axis of the bellows, 2) eccentricity of the center of rigidity of the bellows relative to the geometrical longitudinal axis, and 3) the ratio between actual compressive force and critical compressive load, called the Euler load.

Practically speaking, eccentricity of the vector of the compressive force always exists, and it results in elastic or inelastic buckling of the bellows depending on bending stress induced in the material of the bellows. If maximum bending stress is less than yield stress of the bellows material, elastic buckling will be developed and will result only in nonlinearity in the measured output of the transducer with respect to the applied external pressure $p_1$. Of course where bending stress is close to the yield stress or is slightly higher than yield stress, it will result in irreversible, inelastic buckling of the bellows, and zero shift (measurement error) of the transducer may occur, as well as complete transducer failure.

Eccentricity of the center of rigidity is a result of material that is not isotropic and of deviations in symmetry of geometry of the bellows during production. As is described above, this eccentricity will also result in elastic or inelastic buckling, depending on ratio between actual and yield stresses.

Maximum allowable compression load is called critical load, or Euler load. This load can be found for a "perfect subject"(one made of isotropic material, free of residual stress, loaded at its centroid, and perfectly straight) in compression. If actual load approaches Euler load, it will eventually cause the subject to deflect laterally and then fail in a bending mode. In the present invention where relatively "soft" bellows are preferable, restriction of the maximum allowable applied compressive load by the limits of the calculated Euler load can be an obstacle in employing a bellows to translate $\Delta p$ into an axially applied mechanical force on the vibrating member.

For the reasons described above, bellows manufacturers do not recommend usage of relatively soft bellows for compression loading.

In the present invention the reference pressure $p_0$ itself is contained within the reference chamber, or flexible bellows, and the range of pressures to be measured are applied externally to the bellows, whether or not a pressure chamber surrounds the reference chamber, and the reference pressure will be selected to be less than any of the pressure in the expected operating range of the transducer. Therefore the bellows of the present invention will tend to compress under the influence of any pressure external to the bellows. However, because of the linkage structure described above, and because the vibrating member will resist changes in its length under tension the tendency toward compressive movement of the movable end is resisted, and the bellows is thus in fact subjected to tension loading ("expansion mode") which is inherently more stable. This results in several advantages. One is that the transducer of the invention can be made to measure a wider range of pressures because of its stability (the allowable load on the bellows is restricted only by actual yield stress of the bellows, and not by the relatively lower Euler load in the case of "soft" bellows in compression loading). The transducer itself can also be made physically smaller because measured pressures are made to act externally to the bellows. Thirdly, the electromagnetic coil can also be placed on the outside of the reference chamber instead of necessarily being encapsulated within the chamber. The above described arrangement of the bellows and linkage is also self aligning, thus adding to stability and use of production. "Effect of physical orientation" is also less severe.

Those skilled in the art will appreciate that an embodiment of the invention may be practiced in which the exterior of the reference chamber is exposed directly to an environment or atmosphere of operating fluid pressures without the use of an enclosing pressure chamber. An embodiment of the invention may also be practiced wherein a nondeformable portion of the reference chamber is defined by an extruded, closed ended tube, or similar structure, whereby the vibrating member is contained within the tube, while the electromagnetic coil preferably employed in the invention is mounted in position outside of the tube.

An alternate embodiment of the apparatus of the invention is also contemplated wherein a flexible bellows is employed as the reference chamber with a projecting linkage connected to or mounted upon the exterior surface of the movable end of the bellows. The bellows is mounted at its fixed end upon the interior of a rigid enclosure attached to a rigid body. The mounting of the fixed end of the bellows in the enclosure is spaced from the rigid body in such a way that movement of the movable end of the bellows is not interfered with in any way by the position of the rigid body. At a point on the rigid body more distant from the movable end of the bellows than is the projecting end of the linkage, one end of the vibrating member is attached, and the other end of the vibrating member is attached to the projecting end of the linkage. In this embodiment the bellows reference chamber may be sealed, but is preferably ported to a reference chamber extension, or auxiliary reference chamber, through the rigid body and flexibly coupled to the movable end of the bellows.

Further alternate variations in the geometry of the linkage of the vibrating member to the movable end of the bellows, and the connection of the opposite end of the vibrating member to the rigid body are also contemplated. Variations in the connection of the vibrating member to the movable end of the bellows and to the rigid body will not depart from the scope of the invention wherever a $p_1$ which is greater than $p_0$ and is applied externally to the bellows conveys a force through the linkage to one end of the vibrating member so as to cause an increase in tensile stress in the vibrating member.

BEST MODE OF CARRYING OUT THE INVENTION

Referring now to the drawings wherein like numbers indicate like parts, the invention is further described by detailed reference to preferred embodiments.

Figures 1, 2:
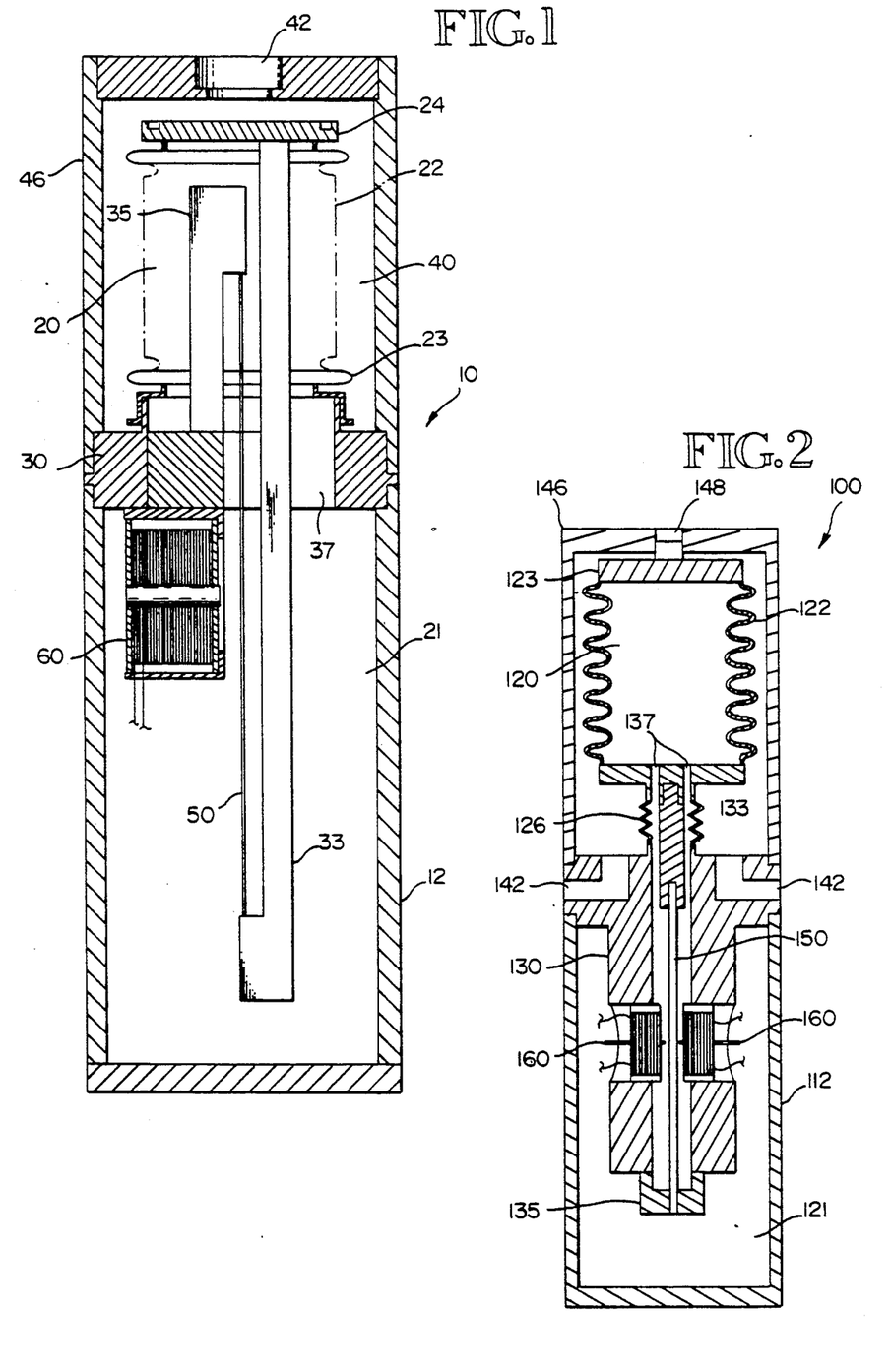
FIG. 1 illustrates a longitudinal cross section of a preferred embodiment of the invention.
FIG. 2 illustrates a longitudinal cross section of an alternate embodiment of the invention.

In FIG. 1 a generally cylindrical pressure transducer 10 has a reference chamber 20, an auxiliary reference chamber 21, a pressure chamber 40, a rigid body 30, an elastic vibrating member 50 and an electromagnetic coil 60. Reference chamber 20 is defined in part by a pressure deformable member 22, preferably of the formed metal bellows type which has pressure movable end 24 and fixed end 23. Pressure chamber 40 communicates through port 42 in pressure chamber enclosure 46 with the fluid pressures to be measured. In the embodiment shown in FIG. 1 the reference chamber occupies most of the interior of pressure transducer 10 is comprised of two chambers 20 and 21 in fluid communication with one another through equalization port 37. The first chamber 20 is defined by body 30, enclosure 46, and pressure deformable member or bellows 22. The second chamber 21 is defined by body 30 and housing 12.

A linkage 33, made of a material and cross section which is axially stiffer than vibrating member 50, preferably by a factor of 100 to 1, preferably attached to the interior side of pressure movable end 24 of bellows 22. This assembly is preferably done in a jig to assure correct and proper alignment of linkage 33 to the axial center line of bellows 22 as will be appreciated by those skilled in the art. In the embodiment shown in FIG. 1, linkage 33 projects through port 37 in body 30, while a body extension 35 is rigidly and firmly attached, or integral, to body 30, (and preferably made of a material and cross section with stiffness equal to or greater than that of linkage 33) to project interiorly into bellows 22, having been aligned with the same kind of care and precision as is linkage 33. Linkage 33 and body extension 35 are selected to have projecting lengths so that the distance between their respective projecting ends is suitable for attaching a vibrating member 50 of a length appropriate to the design and operating range of the transducer, as will be appreciated by those skilled in the art.

Unless otherwise indicated, all materials of transducer 10 are preferably made of stainless steel. Both overall and specific dimensions of transducer 10 and its component part are generally determined by operating pressure ranges and design consideration well understood by those skilled in the art. The preferred cylindrical shape of transducer 10 is not exclusive of other shapes which are contemplated and which may be preferred by others skilled in the art. Enclosure 36 and housing 12 will be generally cylindrical in shape and sealably joined each on one end to rigid body 30, enclosed on their opposite ends. Rigid body 30 is machined to have sealing surfaces for mating with enclosure 46 and housing 12 and also to have a mounting surface for the bellows fixed end 23 and rigid body extension 35. Coil 60 may also be conveniently attached, by provision of a suitable mounting surface or subhousing, to rigid body 30. A typically preferred range of overall transducer dimension will be between 0.75-1.5 inches in diameter and 3-8 inches in length. For such a range of transducer embodiments, linkage 33 will be between 2.5-3.5 inches in length, and body extension 35 will be between 0-1.5 inches in length. In preferred embodiments, linkage 33 has a circular segment shaped cross section. The preferred length of vibrating member 50 will be between 0-1.5 inches in length. The above specifications will vary according to pressure range of the particular transducer. Pressure port 42 can be any kind of opening in enclosure 46, and may also be adapted for connection thereto for suitable hose or fluid pressure conveying conduit, or for inclusion of a filter. For the range of pressure transducers 10 described above as typical, a bellows 22 will have dimensions of 0.5-1 inches in both diameter and length. A Sylphon ® bellows manufactured by Robert Shaw Controls Co., Knoxville, Tenn., model number A00544-A03 has been employed. Selection of a bellows for a particular transducer unit will require consideration of bellows self resonance, so as to best avoid spurious resonance in the transducer.

While a pressure transducer 10 with an enclosure 46 is preferred to prevent damage to relatively delicate bellows 22, it will be appreciated that enclosure 46 is not essential to the operation of the invention.

In FIG. 2 an alternate embodiment of the invention is illustrated. Pressure transducer 100 has a reference chamber with a first chamber 120 defined by bellows 122 and a second chamber 121. Bellows 122 has a pressure movable end 124 and a fixed end 123 threadably attached to rigid pressure chamber enclosure 146 by bolt 148. In this embodiment bellows 122 and flexible sleeve 126 form the pressure deformable member portion of the reference chamber. First chamber 120 is surrounded by a pressure chamber 140 which is in fluid communication with an external pressure to be measured through ports 142 in body 130. Enclosure 146 is sealably and rigidly attached to body 130, which together define pressure chamber 140. First chamber 120 communicates with second chamber 121 through ports 137. Second chamber 121 is defined by sleeve 126, body 130 and housing 112 sealably attached to body 130. Alternatively, bellows 122 may be sealed (no ports 137) and chamber 121 will not be part of the reference chamber. In such an embodiment, sleeve 126 may be unnecessary, especially if exposure of vibrating member 150 to the fluid having pressure $p_1$ is not deemed detrimental.

The exterior of pressure movable end 124 of bellows 122 is firmly connected to one end of vibrating member 150 by linkage 133 within sleeve 126. The other end is attached to body extension 135. Vibration in the vibrating member 150 is both induced and detected by dual electromagnetic coils 160 housed within recesses in body 130 on either side of member 150.

When a pressure $p_1$ inside pressure chamber 140 is greater than a pressure $p_0$ inside the reference chamber, the resulting $\Delta p$ will tend to move the pressure movable end 124 of bellows 122 along the axial center line of bellows 122 toward the fixed end 123 of bellows 122 thereby directly increasing the tensile stress within vibrating member 150.

In general components of the embodiment illustrated in FIG. 2 are dimensionally and compositionally the same as the embodiment illustrated in FIG. 1 with the exception of ports 137 let through the movable end 124 of bellows 122, flexible sleeve 126, and the shape of body 130. The alternate geometry of the bellows 122, linkage 133, and body extension 135, as compared to the corresponding parts of the embodiment illustrated in FIG. 1, allows a more direct linkage of the movable end of the bellows to the vibrating member. In this embodiment however the pressure enclosure 146 becomes in essence a rigid extension of body 130, insofar as fixed end 123 of bellows 122 must be rigidly mounted to enclosure 146. Where, for reasons further detailed below, it is deemed desirable to have chamber 121 included as a part of the evacuated reference chamber, flexible sleeve 126 sealably completes the passage between chamber 120 and chamber 121. In preferred embodiments flexible sleeve 126 will be comprised of a formed metal bellows having as little stiffness as possible without collapse (low pressure transducers may also employ pleated tubular rubber sleeves at some cost to linearity). Body 130 has a shape which allows projection of body 130 substantially into chamber 121, both for the purpose of mounting coils 160, and also for the purpose of spacing body extension 135 an appropriate distance from the projecting end of linkage 133, therebetween to mount vibrating member 150. The number and dimensions of ports 137 will be determined by design considerations well understood by those skilled in the art.

Figure 3:
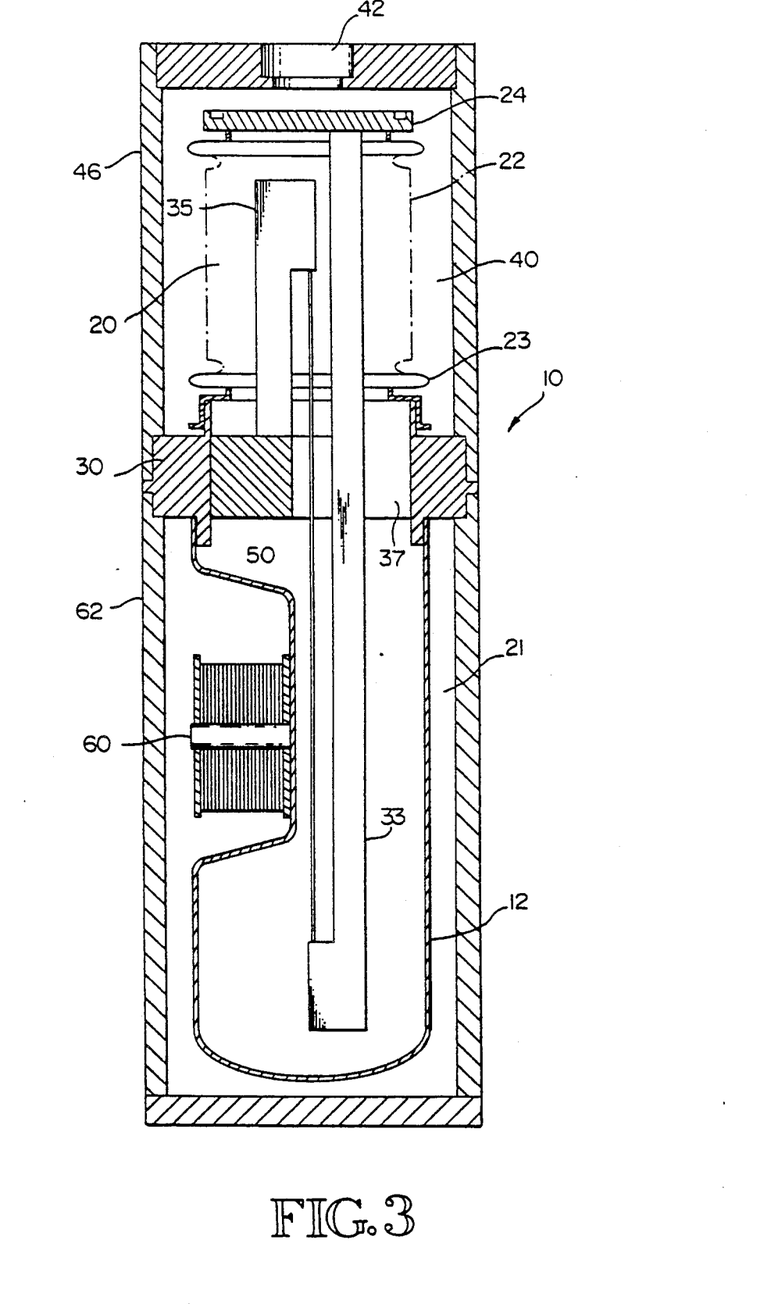
FIG. 3 illustrates a longitudinal cross section of an embodiment alternate to that illustrated in FIG. 1.

In FIG. 3 an embodiment of the invention substantially the same as that illustrated in FIG. 1 is presented. FIG. 3 differs from FIG. 1 in that the auxiliary reference chamber 21 is defined by an auxiliary reference chamber housing 12 preferably comprised of an extruded stainless steel tube of the same material from which a preferred bellows of the invention is typically made. Tube 12 is closed ended and sealably attached to body 30 during assembly with its interior in fluid communication through port 37 with the interior of bellows 22. This embodiment allows the entire interior of the reference chamber 20 and 21 to be evacuated and sealed during assembly prior to the installation of the coil and presents savings and improvements in manufacturing efficiency which will be appreciated by those skilled in the art. It will be appreciated that the function of housing 62 is one of protection of tube 12 and coil 60. Coil 60 may be mounted directly in any well known manner upon tube 12.

In all of the above-described embodiments, the mounting points for both ends of the vibrating member will lie on the axial center line of the preferred bellows-type of pressure deformable member, so that mechanical force generated within the bellows is applied via the linkage (33 or 133) to one end of the vibrating member while it is retained at its other extremity by attachment either to a point directly on the body or its body extension also along the center line of the bellows, so that the vibrating member is thereby subjected to nearly the full mechanical loading produced through the slight compressive movement of the bellows under the influence of $\Delta p$. In all of the embodiments illustrated above, the bellows are thus subjected to tension loading, and the vibrating member is so proportioned that its cross-sectional area material strength and elasticity are adequate to withstand tensile forces greater than those resulting in the application of the maximum rated pressure of the transducer. The electromagnetic coil assembly both provides a means of electrically exciting the vibrating member into vibration at its resonant frequency and of obtaining an electrical output with frequency corresponding to the resonant frequency of the vibrating member.

The preferred bellows of either embodiment of the invention is conventionally constructed of stainless steel and selected to have a stiffness preferably 1/100th or less of the stiffness of the vibrating member. For the embodiment of FIG. 2, the combined stiffness of bellows 122 and sleeve 126 is preferably 1/100th or less of the stiffness of the vibrating member. In contrast with the design requirements of the bellows in the Clements apparatus, where the selection of the bellows stiffness must be balanced with achieving sufficiently high burst pressure rating, in the present invention virtually all pressures within the designed range of pressures for the transducer will exceed those of the reference pressure $p_0$, and burst pressure considerations are therefore not applicable. Instead the relatively higher confinement pressure rating of the bellows becomes one of the selection criteria. It will be possible to select bellows with as little stiffness as possible for greater linearity and precision in pressure measurements with the transducer. In addition, this also results in being able to use both lighter materials for the bellows and smaller bellows in overall dimension.

The body, the linkage, and the body extension, are selected and shaped to be dimensionally stable under operating or working conditions and as insensitive to external influences and stresses as is practically possible. In preferred embodiments the vibrating member takes the form of a single, thin, steel strip. However, other materials in other cross-sectional shapes, as well as multiple vibrating members, can be employed without departing from the scope of the invention, provided the cross-sectional areas and materials chosen are adequate to withstand tensile forces greater than those resulting from the application of the maximum rated pressure of the transducer.

In all preferred embodiments of the invention the reference chamber, including any auxiliary reference chamber wherever provided, is evacuated as close to zero atmospheres as possible. This evacuation provides for less overall temperature sensitivity in the transducer, particularly with respect to temperature induced changes in $p_0$ inside the reference chamber. In addition evacuation of the reference chamber helps to protect the vibrating member from oxidation, particularly where the vibrating member is contained inside either the reference chamber or an auxiliary reference chamber which is also evacuated. In addition evacuation of the reference chamber and bellows assists in pretensioning of the vibrating member.

During assembly of all of the preferred embodiments, the vibrating member is also pretensioned in a jig assembly by slightly compressing the bellows prior to spot welding the remaining unwelded end of the vibrating member to its respective attachment point. When the jig is then released, the natural tendency of the bellows to expand to its uninstalled dimension places a small pretension on the vibrating member itself.

The method of the invention preferably comprises the following steps: (1) exposing an exterior of a bellows having an internal pressure $p_0$ to a pressure $p_1$, said bellows having a movable end movable in response to a difference $\Delta p$ between $p_1$ and $p_0$ and a fixed end attached to a rigid body; (2) allowing the movable end of the bellows to move in response to $\Delta p$ such that an increase in $\Delta p$ increases a tensile stress in an elastic vibrating member connected between the movable end the rigid body, and likewise a decrease in $\Delta p$ decreases the tensile stress; (3) sensing electromagnetically a tensile stress related change in resonant vibrating frequency of the elastic vibrating member corresponding to the difference $\Delta p$ in pressures, and generating a frequency based output signal to convey the magnitude of that frequency change; wherein a first end of the elastic vibrating member is connected to an inside of the movable end of the bellows by a linkage, the linkage disposed longitudinally within the interior of the bellows; and wherein a second end of the elastic vibrating member is connected either to the rigid body or to an extension of the rigid body, with the extension, if any, preferably projecting interiorly into the bellows.

The overall transducer sensitivity or range may be selected or changed by choice of appropriate thickness and widths, and by choice of material, in the vibrating member. The present invention will enjoy the same kind of reduced susceptibility to long-term creep and to the detrimental effects of different temperature coefficients of expansion within the components of the apparatus as is described and disclosed by Clements.

INDUSTRIAL APPLICABILITY

The invention will find use in a variety of engineering applications, particularly in the measurement and detection of pressures and changes in pressure. A pressure transducer according to the invention will employ a pressure deformable member, most typically a bellows, having an internal reference pressure, so that changes in a pressure external to the bellows are detected with respect to the difference between the external pressure and the reference pressure. Since the reference pressure is typically set as close to absolute zero as practically possible, any measured external pressure, or change in external pressure, will be detected by the bellows as a change in the compressional deformation of the bellows. This compressional deformation in the bellows is translated to a change in the tensile stress in an elastic vibrating member under tension which is linked to a movable end of the bellows. This linkage of the elastic vibrating member to a movable end of the bellows, together with arranging the pressure to be measured as a pressure external to the bellows, results in a pressure deformable member which is subjected to tension loading, as opposed to compression loading by other, known pressure transducers.

The present invention will result in improved long term stability and linearity of response for greater accuracy of pressure measurement over a wider pressure range. It will also be easier to manufacture and be less susceptible to failure.

We claim:

1. A pressure transducer for measuring a pressure $p_1$ comprising:
    a) a rigid body:
    b) a reference chamber having a pressure $p_0$ therewithin, said reference chamber comprised of a pressure deformable member having a movable surface movable in a direction orthogonal to said surface, said reference chamber connected to said rigid body;
    c) a magnetically interactive elastic vibrating member connected on a first end to said movable surface and on a second end to said rigid body, such that said movable surface moving in response to an increase in a $\Delta p$ between said $p_0$ and $p_1$ increases a tensile stress in said elastic vibrating member, and a decrease in $\Delta p$ decreases said tensile stress, and wherein said elastic vibrating member is connected at said first end to a projecting end of a linkage, said linkage disposed interior to said bellows and connected to an inside of said movable surface;
    d) electromagnetic means to excite said elastic member into resonant vibration and to generate an output signal with a frequency proportional to tensile stress within said elastic member.

2. The transducer of claim 1 wherein said pressure deformable member comprises a bellows, said bellows having a fixed end connected to said rigid body and said movable surface comprises a movable end movable in response to a difference $\Delta p$ between $p_0$ and $p_1$.

3. The transducer of claim 2 wherein said reference chamber is at least partially enclosed by a pressure chamber having a pressure $p_1$ therewithin in fluid communication with a pressure external to said pressure chamber through at least one port.

4. The transducer of claim 1 wherein said second end of said elastic vibrating member is connected to said rigid body through a body extension.

5. The transducer of claim 4 wherein said body extension projects internally into said bellows.

6. The transducer of claim 2 wherein said elastic vibrating member is connected at said first end to an outside of said movable end of said bellows.

7. The transducer of claim 6 wherein said pressure $p_0$ is practically zero, and said bellows is enclosed by a pressure chamber.

8. The transducer of claim 6 wherein the interior of said bellows is in fluid communication, via one or more ports, with an auxiliary reference chamber within which said elastic vibrating member is disposed.

9. The transducer of claim 8 further comprising a rigid pressure chamber enclosure mounted upon said rigid body and a flexible sleeve, said fixed end of said bellows attached to said enclosure, and said sleeve connected between said movable end and said body.

10. A pressure transducer for measuring a pressure $p_1$ comprising:
    a) a rigid body;
    b) a reference chamber having a pressure deformable member comprised of a bellows, said bellows having a fixed end connected to said rigid body and a movable surface movable in a direction orthogonal to said surface in response to a difference $\Delta p$ between $p_0$ and $p_1$;
    c) a magnetically interactive elastic vibrating member connected on a first end to a projecting end of a linkage, said linkage disposed interior to said bellows and connected to an inside of said movable surface, said elastic vibrating member connected on a second end to said rigid body through a body extension, said body extension projecting internally into said bellows; and
    d) electromagnetic means to excite said elastic member into resonant vibration and to generate an output signal with a frequency proportional to tensile stress within said elastic member.

11. The transducer of claim 10 wherein said linkage and said elastic vibrating member project from an interior of said bellows through a port in said rigid body, and said reference chamber is further comprised of an auxiliary chamber within which said vibrating member is disposed.

12. The transducer of claim 10 wherein said reference chamber is sealed and said pressure $p_0$ is practically zero.

13. The transducer of claim 11 wherein said electromagnetic means is comprised of an electromagnetic coil mounted externally to said auxiliary reference chamber.

14. A method of measuring a difference $\Delta p$ between a pressure $p_1$ and a reference pressure $p_0$, said method comprising the steps of:
 a) exposing an exterior of a reference chamber having an internal pressure $p_0$ to a pressure $p_1$, said reference chamber attached to a rigid body and comprised of a pressure deformable member having a movable end movable in response to $\Delta p$ wherein said pressure deformable member comprises a bellows, and a first end of said elastic vibrating member is connected to an inside of said movable end by a linkage, said linkage disposed longitudinally and interior to said bellows, and wherein a second end of said elastic vibrating member is connected to said rigid body through an extension, said extension projecting interiorly into said bellows;
 b) allowing said movable end to move in response to $\Delta p$ such that an increase in $\Delta p$ increases a tensile stress in an elastic vibrating member connected between said movable end and said rigid body, and a decrease in $\Delta p$, decreases said tensile stress;
 c) sensing electromagnetically a tensile stress related change in resonant vibrating frequency of said elastic member corresponding to said $\Delta p$, and generating a frequency based output signal to convey the magnitude of said frequency change.

15. A pressure transducer for measuring a range of fluid pressures comprising: a) a reference chamber enclosing a fluid under pressure $p_0$ therewithin, said reference chamber comprised of a bellows having a fixed end mounted on a rigid body and a movable end, said bellows deformable in response to a differential $\Delta p$ between $p_0$ and any pressure external to said bellows within said range of pressures; b) a magnetically interactive elastic vibrating member connected on a first end to an interior of said bellows movable end by a linkage, and connected on a second end to said rigid body; c) a body extension projecting interiorly into said bellows from said rigid body, wherein said second end of said elastic vibrating member is attached to said rigid body through a body extension at a point on said extension located a first distance from said movable end of said bellows, and said first end is attached to said linkage at a point on said linkage a second distance from said movable end, said second distance being greater than said first distance.

16. The transducer of claim 15 further comprising a pressure chamber enclosing said bellows.

17. The transducer of claim 15 whereby a tensile stress in said elastic vibrating member is increased by a compression of said bellows.

* * * * *